(12) United States Patent
Künz

(10) Patent No.: US 9,138,930 B2
(45) Date of Patent: Sep. 22, 2015

(54) EXTRUSION BLOW MOLDING METHOD FOR PLASTIC CONTAINERS, ESPECIALLY PLASTIC BOTTLES

(75) Inventor: Johann Künz, Hard (AT)

(73) Assignee: ALPLA WERKE ALWIN LEHNER GMBH & CO. KG, Hard (AU)

( * ) Notice: Subject to any disclaimer, the term of this patent is extended or adjusted under 35 U.S.C. 154(b) by 94 days.

(21) Appl. No.: 12/949,297

(22) Filed: Nov. 18, 2010

(65) Prior Publication Data

US 2011/0062610 A1   Mar. 17, 2011

Related U.S. Application Data

(63) Continuation of application No. PCT/EP2009/001773, filed on Mar. 12, 2009.

(30) Foreign Application Priority Data

May 21, 2008   (CH) .................................... 00769/08

(51) Int. Cl.
*B29C 47/22* (2006.01)
*B29C 47/00* (2006.01)
(Continued)

(52) U.S. Cl.
CPC ........... *B29C 47/0023* (2013.01); *B29C 47/065* (2013.01); *B29C 47/22* (2013.01);
(Continued)

(58) Field of Classification Search
CPC .... B29C 47/06; B29C 47/062; B29C 47/064; B29C 47/065; B29C 47/0023; B29C 47/26; B29C 47/261; B29C 47/265; B29C 47/266; B29C 47/268; B29C 2947/92514; B29C 47/22; B29C 49/04; B29B 2911/14331
See application file for complete search history.

(56) References Cited

U.S. PATENT DOCUMENTS

| 3,257,482 A | 6/1966 | Schechter |
| 4,149,839 A * | 4/1979 | Iwawaki et al. ............ 425/133.1 |

(Continued)

FOREIGN PATENT DOCUMENTS

| DE | 19903084 A1 | 8/2000 |
| DE | 19904199 A1 | 8/2000 |

(Continued)

OTHER PUBLICATIONS

International Search Report (PCT/ISA/210) issued on Sep. 4, 2009, by Japanese Patent Office as the International Searching Authority for International Application No. PCT/EP2009/001773.

(Continued)

*Primary Examiner* — Alison Hindenlang
(74) *Attorney, Agent, or Firm* — Bucnahan Ingersoll & Rooney PC

(57) ABSTRACT

An extrusion blow-molding method for plastic containers, for example, plastic bottles, is disclosed, wherein a one- or multi-layer plastic tube is extruded with a predetermined extrusion pressure through an annular gap, which is delimited by an extrusion die provided on an extrusion head and a axially adjustable mandrel and which can be adjusted with regard to the width thereof. The extruded plastic tube is introduced into a mold cavity of a blow-molding tool arrangement, blow-molded into a plastic container in accordance with the mold cavity by overpressure and then demolded. Additional plastic material is added in metered quantity to the extruded plastic tube at least in some regions in the direct vicinity of the mouth of the extrusion die. The additional plastic material is introduced through one or more discharge nozzles distributed across the circumference with a pressure that is higher than the extrusion pressure such that the plastic material is locally compressed and that, after passing the extrusion die, the plastic tube in the regions provided with the additional plastic material has a greater wall thickness than the remaining plastic tube.

20 Claims, 2 Drawing Sheets

(51) Int. Cl.
 B29C 47/06 (2006.01)
 B29C 47/26 (2006.01)
 B29C 47/92 (2006.01)
 B29C 49/04 (2006.01)
 B29C 49/22 (2006.01)

(52) U.S. Cl.
 CPC .............. *B29C 47/266* (2013.01); *B29C 47/92* (2013.01); *B29C 49/04* (2013.01); *B29B 2911/1434* (2013.01); *B29B 2911/14326* (2013.01); *B29C 49/22* (2013.01); *B29C 2049/048* (2013.01); *B29C 2947/926* (2013.01); *B29C 2947/92647* (2013.01); *B29C 2947/92904* (2013.01); *B29C 2947/92961* (2013.01)

(56) References Cited

U.S. PATENT DOCUMENTS

| | | | | |
|---|---|---|---|---|
| 4,234,302 | A | * | 11/1980 | Valyi .............................. 425/526 |
| 4,578,025 | A | * | 3/1986 | Ando et al. ................. 425/133.1 |
| 4,867,664 | A | * | 9/1989 | Fukuhara ...................... 425/132 |
| 5,252,268 | A | * | 10/1993 | Ohno ........................... 264/40.7 |
| 6,090,338 | A | | 7/2000 | Wrobbel et al. |
| 2003/0000909 | A1 | | 1/2003 | Sakaguchi et al. |
| 2005/0229993 | A1 | | 10/2005 | Imaizumi |
| 2007/0252304 | A1 | * | 11/2007 | Pennington et al. .......... 264/234 |
| 2008/0258349 | A1 | * | 10/2008 | Taylor ........................... 264/440 |
| 2009/0085243 | A1 | * | 4/2009 | Taylor et al. .............. 264/173.12 |

FOREIGN PATENT DOCUMENTS

| | | |
|---|---|---|
| DE | 19929381 A1 | 1/2001 |
| EP | 0726133 A1 | 8/1996 |
| EP | 1533243 A1 | 5/2005 |
| EP | 1685943 A2 | 8/2006 |
| FR | 61856 | 5/1955 |
| FR | 2180570 | 11/1973 |
| JP | 2008-188773 A | 8/2008 |
| WO | WO 2007/098837 A1 | 9/2007 |
| WO | WO 2007098837 A1 * | 9/2007 .............. B29C 49/00 |

OTHER PUBLICATIONS

Cover pages of "Blow Molding Handbook, Technology, Performance, Markets, Economics, The Complete Blow Molding Operation", edited by Donald V. Rosato and Dominick V. Rosato, Oxford University Press, 1995.

* cited by examiner

EXTRUSION BLOW MOLDING METHOD FOR PLASTIC CONTAINERS, ESPECIALLY PLASTIC BOTTLES

RELATED APPLICATIONS

This application claims priority as a continuation application under 35 U.S.C. §120 to PCT/EP2009/001773, which was filed as an International Application on Mar. 12, 1999 designating the U.S., and which claims priority to Swiss Application No. 00769/08 filed in Switzerland on May 21, 2008. The entire contents of these applications are hereby incorporated by reference in their entireties.

FIELD

The disclosure relates to an extrusion blow molding method for plastic containers, for example, plastic bottles.

BACKGROUND INFORMATION

Known containers of, for example, white or colored sheet metal, glass or ceramic are being increasingly replaced by plastic containers. Plastic containers are being used for packaging of fluid substances, for example, beverages, oil, cleaning products, cosmetics, etc. The low weight and lower costs of plastic containers is a factor in deciding on their use. The use of recyclable plastic materials and the favorable overall energy balance in their production also contribute to promoting the acceptance of plastic containers, especially plastic bottles, among consumers.

The production of plastic containers, especially plastic bottles, for example from polyethylene or polypropylene, can take place in extrusion blow molding processes, such as in an extruded tube blowing process. In this connection a plastic tube is extruded from an extruder head, placed in a blow molding tool arrangement, inflated by overpressure via a blow mandrel, cooled and removed from a mold. The extrusion blow molding machines used for this purpose can have at least one extruder for supplying a molten plastic material. The output of the extruder can be connected to an extruder head which has an extrusion die with an annular gap whose width can be controlled via a mandrel which can be axially adjusted relative to the extrusion die. The plastic tube can be extruded continuously or quasicontinuously in one or more layers. The extruded plastic tube can be transferred to a blow molding tool arrangement and can be inflated by overpressure using a blowing mandrel which has been inserted into a mold cavity. Afterwards the plastic container which has been inflated according to the mold cavity can be removed from the mold cavity.

During inflation the plastic tube which has been placed in the mold cavity can be stretched to different degrees depending on the geometry of the plastic container which is to be produced. To ensure that a desired minimum wall thickness is reached at critical locations in this way, for example on edges or corners, in known methods, the wall thickness of the extruded plastic tube has been set overall such that following the blow molding process a sufficiently large wall thickness remained at the more heavily stretched locations on the plastic container. In known methods of production of plastic containers which may not fall below a certain minimum wall thickness in defined regions in their axial extension which runs in a peripheral direction as dictated by design in order to have sufficiently great strength, a total wall thickness of the extruded plastic tube can be oriented to achieving the desired minimum wall thickness. In this way material consumption can be increased in a manner which increases production costs and is wasteful.

To save material, different process versions have been proposed in order to achieve a wall thickness distribution which is as uniform as possible both in a lengthwise and a circumferential direction and to increase the wall thickness of certain critical regions in a controlled manner. For example, DE 199 03 084 discloses providing the discharge nozzle of the extrusion head with an elastically deformable sleeve. The sleeve is pressurized by two actuating cylinders on opposite sides and deformed to a desired extent. An annular gap which is bordered by a mandrel and the sleeve can be changed by a radial deformation of the elastic sleeve. In this way, material can be forced into desired areas on the extruded plastic tube. Alternatively or in addition, the mandrel can have a peripheral region which can be partially adjusted statically or dynamically. This is disclosed, for example, in DE 199 04 199 or DE 199 29 381. These methods and arrangements can be used only for producing relatively large plastic containers, such as for example canisters, plastic barrels, or the like. The actuating cylinders for controlled deformation of the elastic sleeve occupy a relatively large amount of space. Therefore the arrangement for extruder heads with which several plastic tubes which run parallel to one another at the same time are extruded in order to then be inserted into a multiple blow molding tool is not suitable. The arrangement is designed in a container-specific manner. Refitting to another container type can only be done with great difficulty, is labor intensive, time-consuming and expensive.

EP 1 685 943 discloses an extrusion head whose discharge nozzle tapers conically toward the outlet and interacts with an axially adjustable mandrel in order to change a width of an annular gap. The mandrel is equipped with a concentrically arranged plunger which need not necessarily be designed to be rotationally symmetrical and which can be axially moved by a hydraulic actuating mechanism relative to the mandrel. By extending the plunger, the gap width which is fixed by the mandrel and the discharge nozzle, can be additionally tapered if desired. This is designed to displace the material of the plastic tube which is extruded through the annular gap and the material is thus redistributed to the desired extent. The "plunger in mandrel" version can be complex in construction and expensive. This mandrel, due to the plunger embedded in it and the actuating mechanism, has a relatively large outside diameter. Therefore this device can be suitable for producing relatively large plastic containers, such as plastic barrels, plastic tanks or the like. The device is designed for a specific container type and refitting can be time-consuming and expensive.

SUMMARY

An extrusion blow molding method for plastic containers is disclosed, in which a plastic tube is extruded at a given extrusion pressure by an extrusion head with an extrusion die having an annular gap whose width is adjustable by an axially adjustable mandrel, the method comprising placing the plastic tube in a mold cavity of a blow molding tool arrangement; inflating the plastic tube into a plastic container using overpressure within the mold cavity, removing the plastic container from the mold; and charging additional plastic material in regions of the extruded plastic tube in a vicinity of a mouth of the extrusion die under a pressure which has been increased relative to the given extrusion pressure through at least one discharge nozzle distributed over a periphery of the mouth, the additional plastic material being locally compressed such that after passing through the extrusion die, the plastic tube regions provided with the additional plastic material have a greater wall thickness than a remainder of the plastic tube.

BRIEF DESCRIPTION OF THE DRAWINGS

Other advantages and features of the disclosure will become apparent to the ordinarily skilled artisan from the following description of exemplary embodiments with reference to the schematic drawings. The figures are not to scale. In the drawings.

DETAILED DESCRIPTION

Figure 1:
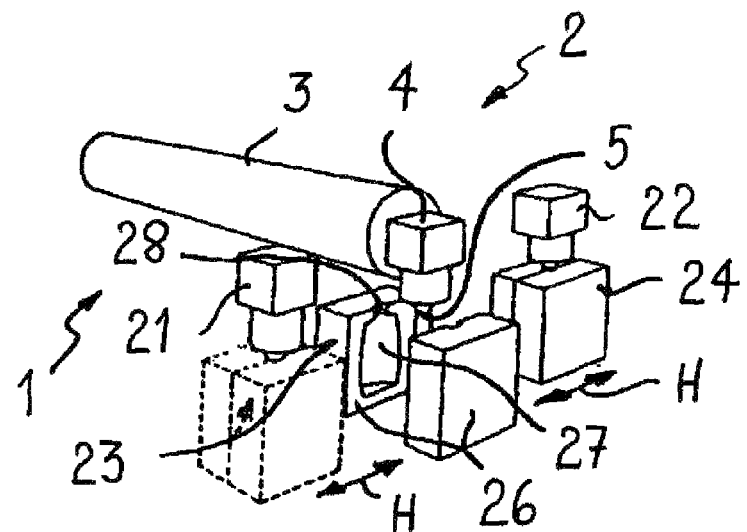
FIG. 1 shows a schematic of an exemplary extrusion blow molding machine with an extrusion head and blow molding tool.

An extrusion method for plastic containers is disclosed, for example, for plastic bottles, which can influence the wall thickness of the extruded plastic tube in a controlled manner for producing small container sizes. Wall thickness of the plastic tube can be optimized and still have available enough material in specified (e.g., critical) regions so that the inflated plastic container can have a desired (e.g., specified) wall thickness and desired strengths everywhere. The method can also be suitable for parallel extrusion of several plastic tubes from a multiple extrusion head. An extrusion head can be refitted easily, quickly, and economically for other container types.

An extrusion blow molding method is disclosed for plastic containers, for example, for plastic bottles, in which a single-layer or multi-layer plastic tube can be extruded at a given extrusion pressure through an annular gap which is bordered by an extrusion die provided on an extrusion head and can include an axially adjustable mandrel and can be adjusted with respect to its width. The extruded plastic tube can be placed in the mold cavity of a blow molding tool arrangement and can be inflated, by overpressure, according to the mold cavity into a plastic container and then removed from the mold. If desired, at least in regions, additional plastic material can be admixed with the extruded plastic tube in, for example, the vicinity of a mouth of the extrusion die. The additional plastic material under a pressure which has been increased relative to the extrusion pressure can be introduced into the extruded plastic tube by one or more discharge nozzles which can be distributed over a periphery of the mouth of the extrusion die such that the plastic material can be locally compressed. After passing through the extrusion die, the plastic tube on the regions provided with additional plastic material, can have a greater wall thickness than the remaining plastic tube.

To differentiate from known methods, in an exemplary extrusion blow molding method of the disclosure, material distribution does not take place by material displacement. Rather additional plastic material can be added in those regions of the extruded plastic tube which could lead to specified (e.g., critical) wall thicknesses and poor strengths of the plastic container which were produced during inflation. In this way the plastic container can be optimized with respect to material use. The plastic tube can be extruded with a wall thickness which is so great that the container which has been inflated from it has desired minimum wall thicknesses and strengths in any or all noncritical regions. Wherever the minimum wall thickness could not be reached in the stretching of the material caused by the blow molding process, additional plastic material can be added in a controlled manner. The admixed amount of plastic corresponds to the additional amount desired for achieving desired required wall thickness and strengths. The additional plastic material can be admixed with the extruded plastic tube at an overpressure in the immediate vicinity of the mouth of the extrusion die (e.g., within a vicinity substantially near the mouth as to achieve the attributes disclosed herein). The pressure with which the additional plastic material is forced into the extruded plastic tube can be greater than the general extrusion pressure and can lead locally to brief compression of the plastic material. After passing through the mouth of the extrusion die, the compressed regions expand and the plastic tube, as intended, locally has a greater wall thickness than in its other regions.

The exemplary method can manage without additional actuating means for adjustment of the annular gap width of the extrusion die. An actuating mechanism for axial adjustment of, for example, a plunger located in the mandrel is not required. In this way the extrusion die and the mandrel which limit the width of the annular gap can be made relatively smaller. This can also enable, for example, the production of smaller containers, for example, plastic bottles of 3l capacity and smaller. The additional actuating drives and mechanisms in the extrusion head can be eliminated. In this way, on the extrusion head there can be several extrusion dies with assigned mandrels by which several plastic tubes can be extruded at the same time. Complex actuating drives and mechanisms for elastically deformable sleeves or for plungers which can be extended relative to the mandrel and the pertinent holes for, for example, hydraulic controls can be eliminated and, if desired, the extrusion head can be refitted relatively easily and economically for other container types. This can increase the flexibility and economic efficiency of use of the extrusion blow molding machine. An additional discharge nozzle in the vicinity of the mouth of the extrusion die can be made annular. This can enable formation of regions which have been annularly thickened without having to change the annular gap width which is bordered by the extrusion die and the mandrel.

The additional plastic material can be charged at a distance of, for example, from 2 mm to 20 mm from the mouth of the extrusion die. A shorter distance of the discharge nozzle(s) from the mouth of the extrusion die on the extruded plastic tube can yield a relatively abrupt transition in wall thickness. For greater distances the change of wall thickness can take place continuously.

The pressure with which the additional plastic material is forced into the extruded plastic tube can be roughly, for example, 20% to 150% higher than the extrusion pressure. At a general extrusion pressure of, for example, 40 bar, the pressure with which the additional plastic material can be forced into the plastic tube can be up to about 100 bar. For higher extrusion pressures the pressure differences can be accordingly smaller.

In an exemplary embodiment additional plastic material is not admixed through a single discharge nozzle. There can be several discharge nozzles which can be distributed over the periphery and which have a varying distance from the mouth of the extrusion die.

The plastic tube can be continuously extruded, for preparing transitions as short as possible to the regions of greater wall thickness. It is desirable if the additional plastic material is charged in a time-controlled manner from at least one intermediate storage in the extrusion head. The use of at least one intermediate storage allows shorter channel lengths into which the additional plastic material for preparing the regions with greater wall thickness should be placed. In the intermediate storage there can be enough plastic material which is being extruded by the discharge nozzles as soon as the pressure cylinder forces new plastic material into the intermediate storage. The pressure cylinder for charging the additional plastic material need not be located within the extrusion head either but can also be located at another suitable location of the extrusion blow molding machine. There can be a separate extruder for feed of each intermediate storage with plastic material.

In one exemplary embodiment of the disclosure, the additional plastic material can be forced out through one or more discharge nozzles which are distributed over the periphery of the mouth of the extrusion die and which can be supplied with plastic material individually or in groups from different intermediate storages. The discharge nozzles can also have different distances from the mouth of the extrusion die and can be offset against one another in the peripheral direction depending on the article. For example, a first row can have two discharge nozzles which can be diametrically opposite one another. In a second row there can be one or two other discharge nozzles which are offset relative to those of the first row, depending on the article. For example, the offset can be roughly 90°. In this way, for example, with the first row of discharge nozzles, specified (e.g., critical) regions on the transitions from the container body to the bottom or top region can be taken into account, while with the discharge nozzle offset in the peripheral direction in the second row, for example, a region of lower inherent stiffness underneath the pouring nozzle of a plastic bottle can be taken into account and therefore can be provided with a greater wall thickness. The discharge nozzles of the two rows can be supplied with plastic material if desired from a separate intermediate storage. The intermediate storages can be supplied with material from separate extruders.

The additional plastic material can be interim-stored, for example, in one or more annular spaces which can be located in a section of the extrusion head which surrounds the mandrel. Each intermediate storage can be connected to at least one of the discharge nozzles. Due to this arrangement, the extrusion head which in a known configuration is composed of different components in a modular manner, can be refitted very easily to a new configuration if desired.

For plastic tubes which have been extruded in several layers it can be provided that each of the extrusion dies for one layer can be assigned at least one discharge nozzle which allows, at least in regions, additional plastic material to be charged to the respective layer if desired. In known configurations, the plastic material including the respective layer of extruded plastic tube and the charged additional plastic material can be the same materials. An exemplary embodiment according to the disclosure can also allow the addition of different plastic materials in zones, which materials are compatible with the plastic material of the respective layer. This can be desirable, for example, in order to impart specific properties in zones to the plastic container which has been produced from the extruded plastic tube. For example, in this way mechanical and chemical properties can be influenced in a controlled manner from zone to zone.

Depending on the layer material of the extruded plastic tube, the admixed additional plastic material can be chosen from the group comprising (e.g., consisting of) polyolefins, mixtures of polyolefins, thermoplastic PE, HDPE, LDPE, or blowable PET.

If desired, a plastic material can also be charged whose color is different from the color of the remaining plastic tube. This can be the case for example only for aesthetic reasons. But it can also be intended to suggest to the user quite defined handling of the container by color deposition on certain regions. For example reinforced regions which can be especially suitable for handling can be emphasized by special coloring, etc.

An exemplary embodiment of the method calls for the plastic tube to be extruded in several layers. Here at least one of the plastic layers which, in known methods, do not form the outside layer of the plastic tube includes so-called mill regenerate material. Mill regenerate material can be produced, for example, from "scrap material" which arises in container production, for example from lost, cut off heads, fittings projecting from the bottom of the container, etc. Because this material has already passed through the production process once, it can have color fluctuations. Therefore it is desirable if this material is used in one of the intermediate layers. For dark colored plastics mill regenerate can also be used for outside layers. In this case the mill regenerate can also be used for charging of the additional plastic material to increase the wall thickness.

Due to the space-saving design of the extrusion head, the process guidance of an exemplary embodiment of the disclosure can be suitable for multiple extrusion heads in which there are several extrusion dies through which several plastic tubes, located substantially parallel to one another, can be extruded in one or more layers at the same time. If desired, additional plastic material can be admixed with each layer of the extruded plastic tubes at least in zones. The extruded plastic tubes can then be transferred to a multiple tool in which several plastic containers can be inflated from the tube segments at the same time and can be removed from the mold after their completion.

An exemplary extrusion blow molding machine 1 is shown schematically in FIG. 1. The fundamental structure of long stroke extrusion blow molding machines is known and is described for example in *Blow Molding Handbook*, edited by Donald V. Rosato and Dominick V. Rosato, 1989, ISBN 1-56990-089-2, Library of Congress Catalog Card Number 88-016270. FIG. 1 is therefore limited to the understanding of relevant components of the extrusion blow molding machine 1. The two-station blow molding machine shown by way of example has an extrusion unit 2 and two blowing stations 21, 22. The extrusion unit 2 has at least one extruder 3 for plastic granulate and an extrusion head 4 which is connected to it and which has at least one extrusion die 5. Each blowing station 21, 22 is equipped with a blow molding table 23, 24, in which blow molding tools 26 are mounted. The blow molding tools 26 each surround at least one blow molding cavity 27 which corresponds to the shape of the hollow body which is to be produced, for example a bottle. The blow molding cavities 27 on their top facing the extrusion head 4 have a mouth 28. The latter is used to insert a blowing mandrel which is provided in the blowing head of the respective blowing stations 21, 22. The blow molding tables 23, 24 can be moved alternately out of their side end positions in the blow molding stations 21, 22 into a position in which the mouth of the blow molding tool 26 is axially flush with the output of the extrusion die 5. The lateral displacement of the blow molding tables 23, 24 takes place substantially perpendicular to the lengthwise extension of the extruder 3 and is indicated in FIG. 1 by double arrows H.

The plastic granulate which has been supplied via the extruder 3 can be melted in the extruder 3 and/or in the extrusion head 4 and is extruded through an annular gap of the extrusion die 5 as an endless plastic tube. The plastic tube can be extruded in one or more layers. For extrusion of a multi-layer plastic tube there are other extruders which transport the desired different plastic materials to the extrusion head 4. The blow molding tables 23, 24 with the blow molding tools 26 can be moved in alternation out of their end positions into the blow molding stations 21, 22 laterally to under the extrusion head 4, the blow molding tools 26 are opened and a piece of the extruded plastic tube is retrieved. Afterwards the respective blow molding table 23, 24 can again be moved back into its end position in the blow molding station 21 and 22. There, the hollow body can be inflated by overpressure using a blowing mandrel which has been inserted into the cavity 27 through the mouth 28. In doing so, the pouring nozzle or the bottle neck can be calibrated with the pour opening at the same time. The finished hollow body can be ejected and the cycle can be repeated. While a tube is being inflated in the mold cavity in a blow molding station 21, the blow molding table 24 of the second blow molding station 22 can be moved laterally to under the extrusion head 4 in order to retrieve another piece of the extruded plastic tube. Continuous operation can be enabled in this way.

Figure 2:
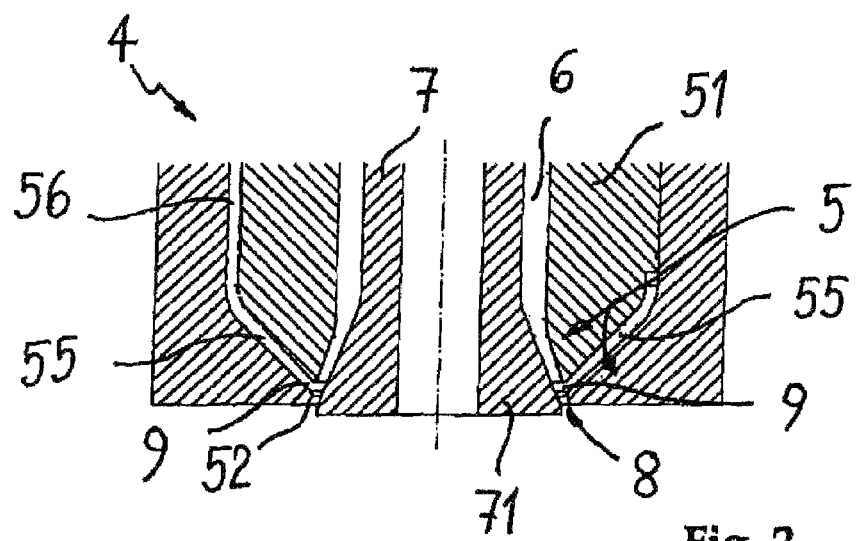
FIG. 2 shows a schematic axial section of part of the exemplary extrusion head with an annular gap which is bordered by the extrusion die and a mandrel.

FIG. 2 shows a section of a lower segment of the extrusion head 4 with the extrusion die 5. The extrusion die 5 includes a die body 51 and a central extrusion channel 6 in which a coaxially arranged mandrel 7 with a truncated conical widening 71 is guided to be vertically adjustable. The die body 51 and the mandrel 7 can be interchangeably mounted in the extrusion head 4. Due to the vertical adjustment of the mandrel 7, the width of the annular gap 8 which is limited by the extrusion die 5 and the mandrel 7 can be adjusted. Thus, the thickness of the extruded plastic tube can be varied if desired. In an end section of the die body 51 facing one free end of the mandrel 7, an annular space 55 is recessed which is used as an intermediate storage and is supplied with the molten plastic material via a supply channel 56. A conveyor cylinder, which is located at a suitable site of the extrusion head can provide for the intermediate storage to always be sufficiently filled. The annular space 55 can be connected to the central extrusion channel 6 via one or more discharge nozzles 9. The discharge nozzles 9 can be designed, for example, as annular gap segments. There can be two or more discharge nozzles 9 which are located annularly around the mandrel 7. The discharge nozzles 9 can be located in the immediate vicinity of the annular nozzle 8. The distance of the discharge openings 9 from the mouth 52 of the extrusion die 5 can be roughly 2 mm to 20 mm, or lesser or greater.

In one exemplary embodiment of the disclosure, one or more discharge nozzles can be combined into groups which can be arranged annularly along a peripheral circle of the nozzle body and/or have different distances from the mouth of the extrusion die. The discharge nozzles can be connected individually or in groups to different intermediate storages from which additional plastic material can be supplied if desired. Each intermediate storage can be supplied with molten plastic material by its own extruder. In the case of several rings of discharge nozzles they can be arranged offset against one another in the peripheral direction in a manner specific to the article. For example, in the first row there are two discharge nozzles which are diametrically opposite one another. In the second row which has a greater distance from the mouth of the extrusion die, there can be one or more other discharge nozzles which can be located offset in the peripheral direction relative to the discharge nozzles of the first row.

Figure 3:
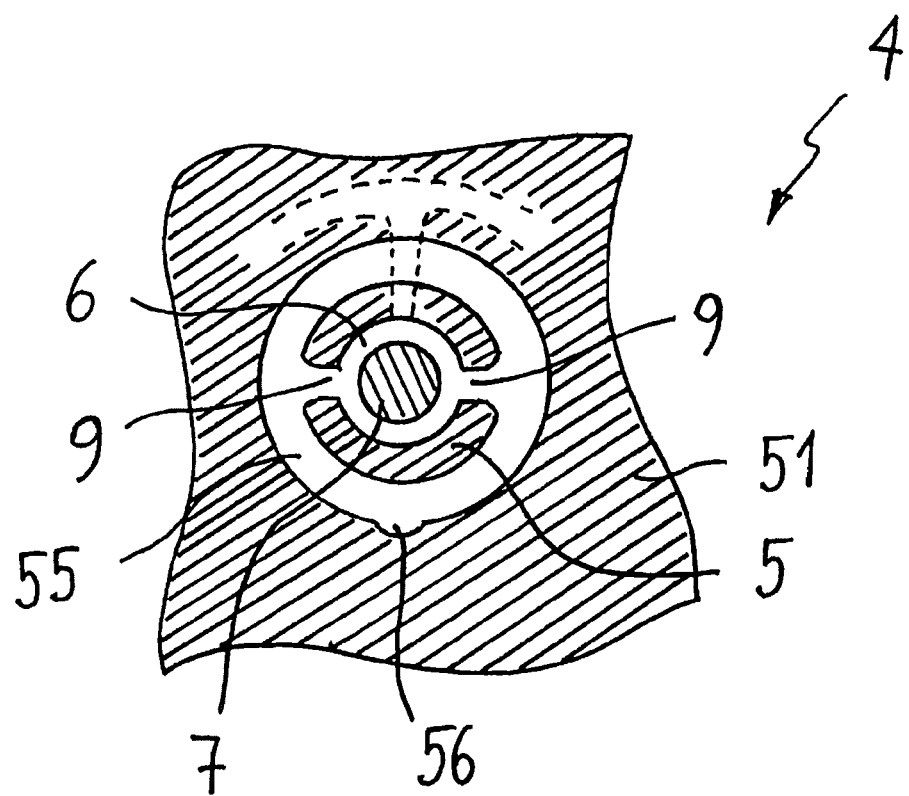
FIG. 3 shows a schematic cross section through the extrusion head in the region of the discharge nozzles which discharge into the annular gap.

FIG. 3 shows a cross section of another exemplary embodiment of an extrusion head 4. The schematic shows the central extrusion channel 6 which is bordered by the extrusion die 5 and the mandrel 7 at the height of the first annular arrangement of the discharge nozzles 9. The same parts bear the same reference numbers as in the other figures. The two discharge nozzles 9 which are roughly diametrically opposite one another, can be connected to the annulus 55 which is used as the intermediate storage. The supply channel which runs vertically in the die body 51 is labelled 56. Another discharge nozzle which has a greater distance from the mouth of the extrusion die 5 and which would accordingly be above the plane of the drawings in the illustrated exemplary embodiment is shown by the broken line. This other discharge nozzle can be offset by roughly 90° in the peripheral direction relative to the discharge nozzles 9 which lie in the plane of the drawings and can be connected to another annular intermediate storage for molten plastic material which is likewise shown by the broken line in FIG. 3.

The material for the single-layer or multilayer plastic tube, which has been extruded on the annular gap 8 of the extrusion head 4, can be continuously conveyed through the central extrusion channel 6. For this purpose, the plastic material which is present first in granulate form is fed into an extruder, melted and transported to the extrusion head 4. For multilayer extrusion, there can be several extruders which transport the material in the molten state to the extrusion head, where it is fed into the central extrusion channel 6 through substantially annular supply openings which are arranged in succession. The width of the annular gap bordered by the extrusion die 5 and the mandrel 7 and thus the wall thickness of the extruded plastic tube, if desired, can be set by vertical adjustment of the mandrel 7 which is located coaxially in the central extrusion channel 6. The discharge nozzles 9 which are distributed annularly over the periphery and which are connected to the annulus 55 which is used as an intermediate storage for additional plastic material can make it possible to provide the extruded plastic tube with a greater wall thickness in zones. For this purpose additional plastic material is added to the continuously extruded plastic tube in a time-controlled manner through the discharge nozzles 9. The additional plastic material can be forced into the plastic tube which has been routed past the discharge nozzles 9 with a much higher pressure than the extrusion pressure and in these zones leads to temporary compression of the plastic material of the tube. The pressure with which the additional plastic material is forced into the extruded plastic tube can be 20% to 150% higher than the extrusion pressure. At a general extrusion pressure of, for example, 40 bar, the pressure with which the additional plastic material is forced into the plastic tube can be up to 100 bar. At higher extrusion pressures the pressure differences are accordingly less. After passing through the annular gap 8 these zones can expand again. The result is an extruded plastic tube which in defined zones has a greater wall thickness than in the remaining plastic tube.

The discharge nozzles for additional plastic material can also be connected individually or in groups to different intermediate storages for the melted material in order to obtain even greater flexibility for article-specific material supply.

The plastic material which has been additionally applied to the extruded plastic tube can be the same material as the tube material. But a material which is different from the tube material and which is compatible with the tube material can also be added. This can be desirable, for example, in order to impart quite specific properties to the plastic container which has been produced from the extruded plastic tube in zones. For example, in this way a gripping zone can be prepared which has better adhesion properties than the remaining portion of the container. Depending on the material of the extruded plastic tube the admixed additional plastic material can be chosen from the group consisting of polyolefins, mixtures of polyolefins, thermoplastic PE, HDPE, LDPE or blow moldable PET.

If desired, a plastic material can also be charged whose color is different from the color of the remaining plastic tube. This can be the case, for example, only for aesthetic reasons. But it can also be intended to suggest to the user quite defined handling of the container by color deposition on certain regions. For example, reinforced regions which are especially suitable for handling can be emphasized by special coloring, etc.

An exemplary method in the disclosure makes it possible to produce a plastic tube which has been extruded in a single-layer or multiple layers in a controlled manner in zones and in a manner specific to the layer with a larger wall thickness. For this reason, design-dictated weak sites and critical sites will be considered with respect to the wall thickness for different container geometries. The exemplary method can also make it possible to influence the mechanical and chemical properties of certain zones and layers of the container to be produced in a controlled manner or to produce them with another color. Depending on the distance of the discharge nozzles from the mouth of the extrusion die for the respective layer of the extruded plastic tube, the wall thickness transitions can be produced essentially abruptly or continuously. For implementation of the method complex modifications of the extrusion head are unnecessary. The additional components with the intermediate storages and discharge nozzles can also be refitted in existing extruder heads. They save space, for which reason the exemplary method according to the disclosure can be suitable for multiple extrusion heads for multiple tools. The space-saving arrangement does not require a minimum size of the containers to be produced but makes it possible to also use the exemplary method in the production of plastic containers, especially plastic bottles with small volumes.

The exemplary method has been explained using the example of a two-station, extrusion blow molding machine. Extrusion blow molding machines, including those which work according to wheel technology, can be modified in order to produce plastic containers, especially plastic bottles, according to the exemplary method. The extrusion head can have a central extrusion channel which widens in the extrusion direction, as described in the exemplary embodiments. The extrusion channel can however also taper in the extrusion direction. The mandrel which interacts with the extrusion die can be designed accordingly in order to enable a change of the annular gap width if desired.

Thus, it will be appreciated by those of ordinary skill in the art that the present invention can be embodied in other specific forms without departing from the spirit or essential characteristics thereof. The disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

What is claimed is:

1. Extrusion blow molding method for manufacture of plastic containers; the method comprising:

extruding a layer of a plastic tube at a given extrusion pressure by an extrusion head with an extrusion die having an annular orifice whose width is adjustable by an axially adjustable mandrel, said extrusion head and said mandrel delimiting an extrusion channel having a width;

adding to the extruded layer within the extrusion channel, at a distance from 2 mm to 20 mm from a mouth of the extrusion die, metered quantities of additional plastic material in selected regions of the plastic tube, said additional plastic material being added to the layer of the plastic tube through a supply channel having at least one discharge nozzle arranged at a circumference of the extrusion die and extending only over a portion of the circumference of the extrusion die into the extrusion channel at a pressure which has been increased relative to the given extrusion pressure, wherein the width of the extrusion channel at the outlet of the discharge nozzle is narrower than an upstream width of the extrusion channel, the plastic tube and the additional plastic material being locally compressed in the extrusion channel such that after passing through the annular orifice of the extrusion die, those plastic tube regions of the layer including the additional plastic material have a greater wall thickness than a remainder of the layer and of a remainder of the extruded plastic tube;

placing the plastic tube in a mold cavity of a blow molding tool arrangement; and inflating the plastic tube into a plastic container using overpressure within the mold cavity.

2. Extrusion blow molding method as claimed in claim 1, wherein a plurality of discharge nozzles can be arranged at a same distance from the mouth of the extrusion die and offset in a circumferential direction.

3. Extrusion blow molding method as claimed in claim 1, comprising:

forcing the additional plastic material into the extruded plastic tube at a pressure 20% to 150% higher than the given extrusion pressure.

4. Extrusion blow molding method as claimed in claim 3, comprising:

arranging the at least one discharge nozzle to have a varying distance from the mouth of the extrusion die for admixing the additional plastic material.

5. Extrusion blow molding method as claimed in claim 3, comprising:

continuously extruding the plastic tube and charging the additional plastic material in a time-controlled manner from at least one intermediate storage which is provided in the extrusion head.

6. Extrusion blow molding method as claimed in claim 3, comprising:

continuously extruding the plastic tube in several layers; and assigning the at least one discharge nozzle individually to the continuously extruded layers through which the additional plastic material is charged to the layers, which additional plastic material is at least compatible with material of a respective layer of the extruded plastic tube.

7. Extrusion blow molding method as claimed in claim 1, comprising:

arranging the at least one discharge nozzle to have a varying distance from the mouth of the extrusion die for admixing the additional plastic material.

8. Extrusion blow molding method as claimed in claim 7, comprising:

continuously extruding the plastic tube and charging the additional plastic material in a time-controlled manner from at least one intermediate storage which is provided in the extrusion head.

9. Extrusion blow molding method as claimed in claim 1, comprising:
continuously extruding the plastic tube and charging the additional plastic material in a time-controlled manner from at least one intermediate storage which is provided in the extrusion head.

10. Extrusion blow molding method as claimed in claim 9, comprising:
forcing the additional plastic material out through the at least one discharge nozzle distributed over the periphery of the mouth; and
supplying the at least one discharge nozzle with plastic material individually or in groups from different intermediate storages.

11. Extrusion blow molding method as claimed in claim 10, comprising:
interim storing the additional plastic material in at least one annular space which is located in a section of the extrusion head which surrounds the mandrel; and
connecting the at least one annular space to one or several discharge nozzles which are combined into groups.

12. Extrusion blow molding method as claimed in claim 1, comprising:
continuously extruding the plastic tube in several layers; and
assigning the at least one discharge nozzle individually to the continuously extruded layers through which the additional plastic material is charged to the layers, which additional plastic material is at least compatible with material of a respective layer of the extruded plastic tube.

13. Extrusion blow molding method as claimed in claim 1, wherein the additional plastic material is chosen from the group consisting of polyolefins, mixtures of polyolefins, thermoplastic PE, HDPE, LDPE, and blowable PET.

14. Extrusion blow molding method as claimed in claim 1, comprising:
charging the additional plastic material whose color is different from a color of a remainder of the plastic tube at least in zones.

15. Extrusion blow molding method as claimed in claim 1, wherein at least one of the extruded plastic layers contains recycled material.

16. Extrusion blow molding method as claimed in claim 1, wherein on the extrusion head there are several extrusion dies, the method comprising:
extruding at a same time, several plastic tubes which are located essentially parallel to one another via the extrusion dies, the plastic tubes being extruded in one or more layers;
admixing, at least in zones, additional plastic material in a layer-specific manner; and
transferring the extruded plastic tubes to a tool in which several plastic containers are inflated from tube segments at a same time and are removed from the mold after their completion.

17. Extrusion blow molding method as claimed in claim 1, comprising:
forcing the additional plastic material into the extruded plastic tube at a pressure 20% to 150% higher than the given extrusion pressure.

18. Extrusion blow molding method as claimed in claim 1, comprising:
arranging the at least one discharge nozzle to have a varying distance from the mouth of the extrusion die for admixing the additional plastic material.

19. Extrusion blow molding method as claimed in claim 1, comprising:
continuously extruding the plastic tube and charging the additional plastic material in a time-controlled manner from at least one intermediate storage which is provided in the extrusion head.

20. Extrusion blow molding method as claimed in claim 1, comprising:
continuously extruding the plastic tube in several layers; and
assigning the at least one discharge nozzle individually to the continuously extruded layers through which the additional plastic material is charged to the layers, which additional plastic material is at least compatible with material of a respective layer of the extruded plastic tube.

* * * * *